United States Patent
Jain et al.

(10) Patent No.: US 8,761,322 B2
(45) Date of Patent: Jun. 24, 2014

(54) METHODS AND APPARATUSES FOR ENHANCED RECEIVED SIGNAL PROCESSING BASED ON A DATA-SIGNAL-AIDED CHANNEL IMPULSE RESPONSE ESTIMATION

(71) Applicant: QUALCOMM Incorporated, San Diego, CA (US)

(72) Inventors: Manish Jain, Santa Clara, CA (US); Aditya Dua, San Jose, CA (US); Manini Shah, Ahmedabad (IN); Keith Saints, San Diego, CA (US); Farrokh Abrishamkar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 13/633,762

(22) Filed: Oct. 2, 2012

(65) Prior Publication Data

US 2014/0093021 A1    Apr. 3, 2014

(51) Int. Cl.
*H04B 1/10* (2006.01)

(52) U.S. Cl.
USPC ........... 375/346; 375/220; 375/227; 375/260; 375/316; 375/340; 375/341; 455/63.1; 455/67.13; 455/114.2; 455/277.2; 455/296; 455/501; 370/335; 370/342; 714/794; 714/795; 714/796

(58) Field of Classification Search
CPC ......... H04L 1/005; H04L 1/0055; H04L 1/06; H04L 1/0618; H04L 1/0048; H04L 25/0236; H04L 25/067; H04L 25/2647; H04L 25/0328; H04L 25/0212; H04L 25/021; H04L 25/0238; H04L 27/06; H04B 7/0854; H03M 13/31; H03M 13/258; H03M 13/3905

USPC ......... 375/220, 227, 260, 316, 340, 341, 346; 455/63.1, 67.13, 114.2, 277.2, 296, 455/501; 370/335, 342; 714/794, 795, 796
See application file for complete search history.

(56) References Cited

U.S. PATENT DOCUMENTS

| | | | |
|---|---|---|---|
| 6,700,919 B1 | 3/2004 | Papasakellariou | |
| 7,027,519 B2 | 4/2006 | Bao et al. | |
| 7,317,770 B2 * | 1/2008 | Wang | 375/340 |
| 7,450,654 B2 | 11/2008 | Singh et al. | |
| 7,463,691 B2 | 12/2008 | Tao et al. | |
| 7,660,568 B2 * | 2/2010 | Sharma et al. | 455/277.2 |
| 7,907,683 B2 | 3/2011 | Merched et al. | |
| 8,175,071 B2 * | 5/2012 | Nam et al. | 370/344 |
| 8,265,210 B2 * | 9/2012 | Kim et al. | 375/346 |
| 2008/0109701 A1 * | 5/2008 | Yu et al. | 714/760 |
| 2013/0266095 A1 * | 10/2013 | Jonsson | 375/341 |

* cited by examiner

*Primary Examiner* — Leon Flores
(74) *Attorney, Agent, or Firm* — Charles Chesney

(57) ABSTRACT

The present disclosure presents methods and apparatuses for enhanced received signal processing using signal-based channel impulse response (CIR) estimation. For example, according to an example method presented herein, a user equipment (UE) or a component therein may receive a signal corresponding to a transmitted signal sent by a network entity, wherein the transmitted signal comprises at least a data channel, estimate chip contents of the transmitted signal, based on the received signal including the data channel, to obtain estimated chip contents, and compute an estimated channel impulse response (CIR) based on at least the estimated chip contents. Based on this estimated CIR, the UE may thereafter reprogram a received signal reconstruction filter, perform interference cancellation procedures, and/or adjust one or more equalizer taps. By performing such functions, the UE may exhibit improved communication characteristics and enable a more robust user experience.

36 Claims, 11 Drawing Sheets

METHODS AND APPARATUSES FOR ENHANCED RECEIVED SIGNAL PROCESSING BASED ON A DATA-SIGNAL-AIDED CHANNEL IMPULSE RESPONSE ESTIMATION

BACKGROUND

1. Field

Aspects of the present disclosure relate generally to wireless communication systems, and more particularly, to methods and apparatuses for enhanced received signal processing according to a data-signal-aided channel impulse response (CIR) estimate.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. As the demand for mobile broadband access continues to increase, research and development continue to advance the UMTS technologies not only to meet the growing demand for mobile broadband access, but to advance and enhance the user experience with mobile communications.

For example, equalization and interference cancellation are key aspects of any WCDMA downlink receiver, such as a user equipment (UE) or a receiver component in such a UE. Due to the large bandwidth used for WCDMA communications, the frequency-selective behavior of a wireless channel is non-negligible and should be combated at the receiver using equalization techniques. In addition, due to reuse of carrier frequencies in adjacent cells, a WCDMA downlink signal can be significantly impaired by inter-cell interference, which is often combated using interference rejection and/or interference cancellation techniques.

Certain legacy solutions to these issues rely heavily on an estimate of the wireless channel impulse response (CIR), not only for equalization, but also for interference estimation/cancellation. In these legacy solutions, the CIR is estimated from a known pilot or Common Pilot Channel (CPICH) transmitted by a network entity (e.g., a NodeB and/or base station) associated with a cell.

Some sample techniques used in such legacy solutions utilize the following parameters and functions in computing estimated CIRs:

x(n): Signal, e.g., sequence of chips, transmitted by the network entity h(k): $k^{th}$ tap of a wireless channel from the network entity to the UE y(n): Sequence of chips received at the UE w(n): Additive thermal noise/interference from other cells received at the UE In such legacy solutions, the UE receiver may first receive a signal from the network entity. This received signal may be represented at the chip level in terms of the above notation by the function:

$$y(n) = \sum_{k=0}^{K-1} h(k)x(n-k) + w(n)$$

wherein K is the length of channel, for example, in chips.

Furthermore, the signal contains a known pilot signal and an unknown data signal, both transmitted by the network entity, and may be represented (as transmitted) by the function:

$$x(n) = \sqrt{\frac{E_{cp}}{I_0}} o_0(n)x_0 + \sum_{j=1}^{255} \sqrt{\frac{E_{cj}}{I_0}} o_j(n)x_j$$

Here $I_0$ represents the received signal power, $E_{cp}$ represents the pilot channel power, and $E_{cj}$ represents the power of the $j^{th}$ channel, $x_j$ denotes the symbol transmitted on the $j^{th}$ channel, $o_j(n)$ is the product of the orthogonal variable spreading factor (OVSF) code for channel j and the scrambling code sequence for the cell, and j=0 (associated with the first term of the function) represents the pilot (and/or CPICH) channel.

Furthermore, the correlation of y(n) and $o_0(n)x_0$ (i.e. the pilot channel) is represented in some legacy solutions as:

$$E[y(n+l)o_0(n)x_0^*] = E\left[\sum_{k=0}^{K-1} h(k)x(n+l-k)\{o_0^*(n)x_0^*\} + w(n+l)\{o_0^*(n)x_0^*\}\right]$$

where any asterisk notation (*) donates the complex conjugate of a quantity, and where l is an index associated with the correlation. In addition, assuming that any noise or interference and the transmitted chips are not correlated and that the OVSF code associated with the pilot channel is orthogonal to the OVSF codes associated with other channels, legacy methods may update the previous function to:

$$E[y(n+l)o_0(n)x_0^*] = \sum_{k=0}^{K-1} h(k)E\left[\left\{\sqrt{\frac{E_{cp}}{I_0}} o_0^*(n+l-k)x_0^*\right\}\{o_0^*(n)x_0^*\}\right] + 0$$

Additionally, because WCDMA chips are scrambled using relatively long pseudo-noise (PN) codes, the transmitted chips are statistically uncorrelated with each other, such that $E[o_0(m)o_0^*(n)]=\delta(m-n)$, wherein $\delta$ is a delta function equal to 1 when m=n, otherwise the delta function equals 0. Using this property, legacy UEs can reduce the above function to:

$$E[y(n+l)o_0(n)x_0^*] = \sqrt{\frac{E_{cp}}{I_0}} \sum_{k=0}^{K-1} h(k)\delta(l-k)$$

Thus, according to legacy solutions, the cross-correlation of the pilot signal and y(n) yields an estimated CIR:

$$E[y(n+l)o_0(n)x_0^*] = \sqrt{\frac{E_{cp}}{I_0}} h(l)$$

Therefore, in some legacy solutions, the CIR is estimated by correlating the received signal with the chips transmitted on the pilot channel (e.g., CPICH). This is possible because the OVSF code used with the pilot channel is known by the UE and the other channels are transmitted using orthogonal OVSF codes. Thus, the received signal can be utilized to compute the estimated CIR.

In typical WCDMA deployments, the pilot signal is transmitted constantly on the pilot channel by the base station or NodeB at a fraction of the total cell power—often as little as ten percent. This limits the quality of the estimated CIR at the UE and impacts end user performance as a result. Therefore, there is a need for methods and apparatuses for improved CIR estimation to provide more reliable channel estimates upon which received signal equalization, interference estimation, and/or interference cancellation may be based.

SUMMARY

Figure 1:
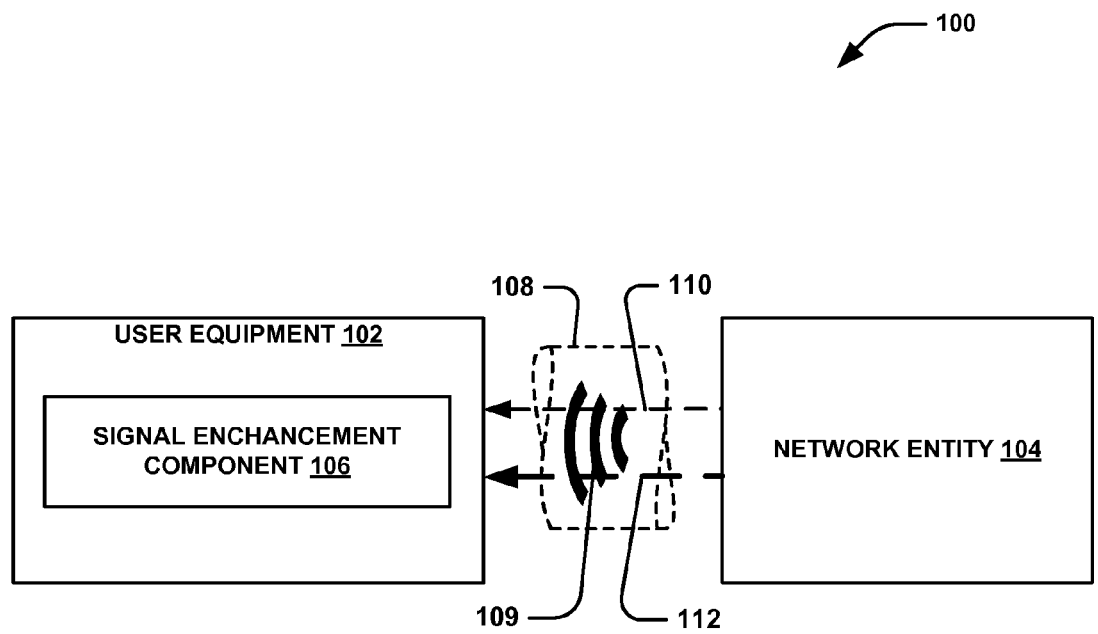
FIG. 1 is a block diagram illustrating an example wireless system of aspects of the present disclosure.

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some examples, the present disclosure presents a method of enhanced received signal processing that includes receiving a signal corresponding to a transmitted signal sent by a network entity, wherein the transmitted signal comprises at least a data channel, estimating chip contents of the transmitted signal, based on the received signal including the data channel, to obtain estimated chip contents, and computing an estimated channel impulse response based on at least the estimated chip contents.

In an additional aspect, the present disclosure presents an apparatus for enhanced received signal processing, which includes means for receiving a signal corresponding to a transmitted signal sent by a network entity, wherein the transmitted signal comprises at least a data channel, means for estimating chip contents of the transmitted signal, based on the received signal including the data channel, to obtain estimated chip contents, and means for computing an estimated channel impulse response based on at least the estimated chip contents.

Furthermore, the present disclosure describes a computer-readable storage medium for enhanced received signal processing that can include code for one or more of: receiving a signal corresponding to a transmitted signal sent by a network entity, wherein the transmitted signal comprises at least a data channel, estimating chip contents of the transmitted signal, based on the received signal including the data channel, to obtain estimated chip contents, and computing an estimated channel impulse response based on at least the estimated chip contents.

Moreover, the present disclosure presents an apparatus for enhanced received signal processing, which can include a receiver configured to receive a signal transmitted by a network entity associated with a data channel, a signal enhancement component configured to estimate a chip contents of the transmitted signal to obtain an estimated chip contents, and a correlator configured to compute an estimated channel impulse response based on at least the estimated chip contents.

These and other aspects of the disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure teaches methods and apparatuses for improved CIR estimate that base an estimated channel impulse response (CIR) at least in part on one or more estimated data signals transmitted by a network entity and received by a UE in a wireless communication system. The one or more estimated data signals may be represented as or included within channel estimate Ĥ, as used in this disclosure. Basing an estimated CIR at least in part on the one or more data signals can serve as a more reliable and robust method for computing an estimated CIR vis-à-vis legacy methods of relying exclusively on a relatively weak received pilot signal or Common Pilot Channel (CPICH) as the basis for CIR estimation. In some systems, such pilot signals are transmitted by the network entity with a power that may peak, in non-limiting examples, at approximately ten percent of the maximum network entity transmission power. The entire transmitted signal, including the data signal, however, is not known at the UE (e.g., due to transmission path losses, interference, etc.). As a result, according to the present apparatus and methods, the UE derives the data signal from the received signal using the known pilot signal, corrects the received signal based thereon, and then computes a data-aided CIR estimate, such as based on both the pilot signal and the data signal of the received signal, for subsequent use in estimating the transmitted signal.

In an aspect, for each iteration of received signal processing, the transmitted signal estimate may be stored (and/or updated) at a transmit RAM following interference cancellation, equalization and symbol processing of the received signal(s). The transmit RAM may then forward stored data corresponding to the processed symbols of the received signal to a signal reconstruction component, which may be referred to as an Ĥ reconstruction component herein, which may be configured to convolve the output of the transmit RAM. In an aspect, the result of the convolution may be sent to a combiner component, which may be configured to subtract or cancel the convolution result from a copy of the received signal stored in a residual RAM, thereby providing an updated received signal for subsequent iterations of equalization, symbol processing, and interference cancellation, to thereby improve the estimation of the transmitted signal for use in decoding the received signal.

In addition, in aspects of the present apparatus and methods, the UE may execute a CIR re-estimator component to determine a data-aided CIR estimate based at least in part on the data signal. Further, in some aspects, the UE may generate a re-estimated CIR that includes a combination of a traditional CIR estimate, e.g. based on the pilot signal, and the data-aided CIR estimate based on at least the data signal or on the entire received signal. The re-estimated CIR may result from combining the traditional CIR estimate with the data-aided CIR estimate using different weightings, which may vary depending on how a user of the system wants to bias the resulting re-estimated CIR. The UE may utilize the data-aided CIR estimate, or the re-estimated CIR with the data-aided CIR estimate as a weighted component, to program, or intermittently reprogram, the Ĥ reconstruction component, to perform signal interference estimation and cancellation, and/or to recompute taps associated with the UE equalizer. Furthermore, for purposes of the present disclosure, each sequence of the interference cancellation, equalization, symbol processing, and reconstruction operations performed on the received signal may be referred to as an estimation iteration, or more simply, an "iteration." Additionally, because the UE may perform multiple incremental CIR estimates and subsequent channel optimizations, each of which may be derived from a particular set of received data (e.g., a data packet, code block, transport block, or the like, which may be contained in the received signal) the CIR estimate associated with the received signal may improve with each subsequent iteration, thereby improving communication performance of the UE.

In a further aspect, the UE may perform any number of iterations until a desired signal fidelity is achieved. Of course, in practice, the number of iterations is limited by hardware design and computational horsepower. Accordingly, after a desired number of iterations have been performed or a threshold signal fidelity or quality reached or exceeded, the equalized received signals from the cell(s) of interest may be sent to a decoder (e.g., a turbo decoder).

Referring to FIG. 1, a wireless communication system 100 is illustrated that can facilitate an improved CIR estimation and enhancement of corresponding received signal processing, such as interference cancellation, equalization, symbol processing and transmitted signal estimation. System 100 includes at least one UE 102 that may communicate wirelessly with one or more network entities 104 via one or more over-the-air links 108 (e.g., one or more channels, such as but not limited to pilot channels, data channels, etc.). Network entity 104 may be configured to transmit one or more signals 109 to UE 102 over one or more channels, where signal 109 may include a data signal 112 over a data channel and a beacon or pilot signal 110 over a pilot channel (e.g., over CPICH). As such, pilot signal 110 may be referred to as a pilot channel portion of signal 109, while data signal 112 may be referred to as a data channel portion of signal 109. Pilot signal 110 or beacon may be received by UE 102 according to a known timing schedule and may contain a known information set. In an additional aspect, the one or more data signals 112 may represent a greater amount of the power of signal 109 as compared to pilot signal 110. For example, in some aspects, the one or more data signals 112 may comprise a majority or nearly all of the transmit power of signal 109, whereas pilot signal 110 may comprise a minority or about ten percent of the transmit power of signal 109. In any case, typically one or more data signals 112 comprise a greater amount of the transmit power of signal 109 as compared to pilot signal 110 (as illustrated by the relatively thicker line representing the one or more data signals 112).

Additionally, UE 102 may be configured to receive the one or more data signals 112 and/or pilot signals 110 from network entity 104. In an aspect of the present disclosure, the UE 102 may contain a signal enhancement component 106, which may, among other functions, be configured to estimate (and re-estimate) a CIR corresponding to signal 109, where the estimated CIR may be based on the properties of at least the received one or more data signals 112. In other words, rather than relying solely on pilot signal 110, signal enhancement component 106 of the present apparatus and methods alternatively or additionally considers data signal 112 in generating an estimated CIR. As such, due to the relatively greater portion of the transmit power associated with data signal 112 relative to pilot signal 110, signal enhancement component 106 of the present apparatus and methods provides an improved CIR estimation, as compared to a traditional pilot signal-only-based CIR estimation, thereby resulting in improved noise cancellation, equalization, symbol processing, and ultimately an improved estimate of the transmitted signal 109 for use in decoding the received signal.

UE 102 may comprise a mobile apparatus and may be referred to as such throughout the present disclosure. A mobile apparatus or UE may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. Additionally, the one or more network entities 104 of system 100 may include one or more of any type of network component, such as an access point, including a base station (BS) or node B, a relay, a peer-to-peer device, an authentication, authorization and accounting (AAA) server, a mobile switching center (MSC), a radio network controller (RNC), etc. In a further aspect, the one or more signals 112 may include one or more data messages that may be comprised of one or more protocol data units (PDUs) of one or more service data units (SDUs), may be divided into one or more code blocks, and/or may contain a plurality of chips for transmitting data.

Figure 2:
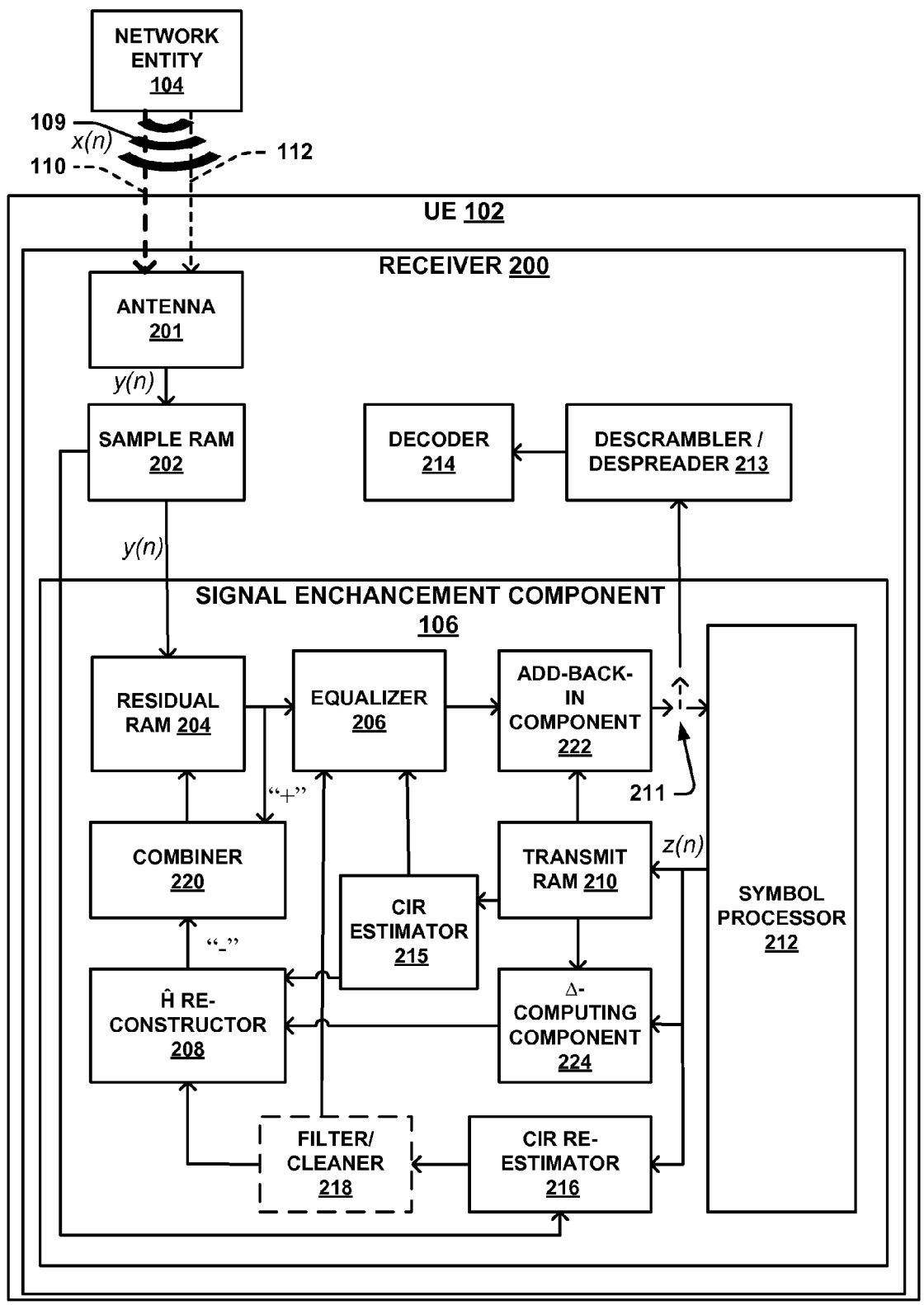
FIG. 2 is a block diagram illustrating a detailed example of a user equipment and its components in an example wireless communications system according to aspects of the present disclosure.

FIG. 2 illustrates an example wireless communication system, which may correspond to system 100 of FIG. 1, including UE 102 configured to perform data-signal-aided CIR estimation. In an aspect, receiver 200 of UE 102 may have an antenna 201 that receives signal 109 including one or more data signals 112 via a data channel and/or a pilot signal 110 via a pilot channel, both of which may be transmitted by network entity 104. The signal 109, including the pilot signal 110 and data signal(s) 112, may be sampled and/or otherwise digitized by receiver 200 and thereafter stored in a Sample Random Access Memory (RAM) 202 associated with UE 102. For example, although not to be construed as limiting, the digitized version of received signal 109 may be represented in a chip domain such that pilot signal 110 and one or more data signals 112 are represented in chip sequences. A chip may be defined as a pulse of a direct-sequence spread spectrum (DSSS) code, such as a pseudo-noise code sequence used in direct-sequence code division multiple access (CDMA) channel access techniques. Copies of the received signal 109 may then be operated on by signal enhancement component 106, for example, for equalization, interference estimation and cancellation, and transmitted signal estimation. For instance, in an aspect, copies of the resulting samples, or chips, may be made by residual RAM 204, and the estimated received signal stored by residual RAM 204 may be updated after each iteration of CIR estimation/re-estimation and/or an associated interference cancellation and equalization process.

Furthermore, the chips representing received signal 109, comprising pilot signal 110 and each of the one or more signals 112 and stored in residual RAM 204 may be passed through an equalizer 206. In an aspect, data and/or pilot signals associated with a plurality of UEs served by network entity 104 may be synchronously received (e.g., by receiver 200) at a particular UE 102, which may be configured (e.g., at receiver 200) to separate UE-specific signals by applying unique orthogonal spreading codes to each received signal. However, in practice, multipath signal propagation may degrade signal orthogonality, which may cause non-negligible multiple-access interference (MAI) and/or inter-symbol interference (ISI), especially for small spreading factors. As such, equalizer 206 may be configured to equalize the received chip sequence representing received signal 109, which may help to correct this orthogonality degradation. In a further aspect, equalizer 206 may be implemented as a tap delay line filter, the coefficients for which may be computed in a variety of ways (e.g., based on a channel matched filter (not shown) or based on a computed minimum mean squared error criterion). In an aspect, the coefficients of the tap delay line filter may be adjusted based on the enhanced, data signal-aided CIR estimate from CIR re-estimator 216 of the present apparatus and methods, which may be combined, such as by weighting, with a tradition CIR estimate from CIR estimator 215, thereby resulting in improved equalization. Additionally, the equalized signal outputted by equalizer 206 may be added to one or more previous estimates of the transmitted signal by add-back-in component 222.

Additionally, signal enhancement component 106 may contain a symbol processor 212, which may be configured to process the equalized and/or added to signal outputted by the add-back-in component 222. In an aspect, symbol processor 212 may receive the signal as represented in a chip domain and convert the signal to a symbol domain, and further perform one or more of descrambling, despreading, and code/symbol domain cleaning, followed in some examples by symbol spreading and scrambling to convert the processed signal symbol(s) back to the chip domain from the symbol domain. In a further aspect, the processed signal outputted by symbol processor 212 represents an estimate of the transmitted signal, and the estimated transmitted signal may populate and be stored within a buffer referred to as a transmit RAM 210.

Further, the current transmitted signal estimate output by symbol processor 212 and stored at transmit RAM 210 may be the basis for subsequent interference estimation and cancellation processes executed by receiver 200. In particular, each new transmitted signal estimate updates signal processing procedures such as CIR estimation, signal reconstruction, interference cancellation and the taps used in signal equalization. Thus, the received signal stored in residual RAM 204 is updated in each processing iteration of receiver 200 based on each new transmitted signal estimate so that the updated received signal approaches a true representation of the transmitted signal as sent by network entity 104, thereby resulting in more accurate decoding of the received signal.

For example, the transmit RAM 210 may send a previous iteration of the transmitted signal estimate to a $\Delta$-computing component 224. The $\Delta$-computing component 224 may be configured to determine a difference between two signals. In an aspect, $\Delta$-computing component 224 may determine a difference between the current transmitted signal estimate received from symbol processor 212 and the previous transmitted signal estimate received from transmit RAM 210. Upon completion of the difference-determining operation, which may be a subtraction operation, $\Delta$-computing component 224 may output the resulting difference to a $\hat{H}$ reconstructor 208.

In an aspect, $\hat{H}$ reconstructor 208 may be a reconstruction filter, such as, but not limited to, a tap delay line filter, which may be configured to perform a convolution operation on the difference output of $\Delta$-computing component 224. Upon completion of the convolution operation, the $\hat{H}$ reconstructor 208 may output the convolution operation result to a combiner component 222, which may be configured to subtract or otherwise cancel the convolved output of $\hat{H}$ reconstructor 208 from the prior contents of residual RAM 204, e.g. the prior copy of the received signal, and forward the result to residual RAM 204. Accordingly, residual RAM 204 replaces the prior copy of the received signal with an updated copy of the received signal from combiner component 222. As such, residual RAM 204 updates the copy of the received signal after each iteration of equalization and interference cancellation performed by signal enhancement component 106.

Further, UE 102 includes a CIR estimator 215, which is configured to generate a pilot signal-based CIR estimate. For example, CIR estimator 215 obtains a current transmitted signal estimate, including a portion representing the pilot signal estimate, from transmit RAM 210 and a current version of the received signal from residual RAM 204. Specifically, for example, CIR estimator 215 applies a channel impulse response algorithm to these inputs, to correlate the received signal with the pilot signal estimate in order to generate the pilot signal-based CIR estimate. A specific example of the channel impulse response algorithm used by CIR estimator 215 is described above, although it should be understood that different algorithms and estimates may be utilized. Subsequently, CIR estimator 215 communicates the pilot signal-based CIR estimate to the $\hat{H}$ reconstructor 208 and to equalizer 206. $\hat{H}$ reconstructor 208 may re-program a reconstruction filter, and equalizer 206 may re-program a tap delay line filter, at least in part based on a value of the pilot signal-based CIR estimate.

In an additional aspect of UE 102, signal enhancement component 106 may include a CIR re-estimator 216, which may be configured to compute a data signal-aided CIR estimate. For example, CIR re-estimator 216 obtains a current transmitted signal estimate, including a portion representing the data signal estimate, from transmit RAM 210 and a current version of the received signal from residual RAM 204. Specifically, for example, CIR re-estimator 216 applies a data-aided channel impulse response algorithm to these inputs, using the received signal with at least the data signal estimate from the transmitted signal estimate to generate a data signal-aided CIR estimate. A specific example of the data-aided channel impulse response algorithm used by CIR re-estimator 216 is described below. Although the below example of the data-aided channel impulse response algorithm utilizes a correlation, it should be understood that CIR re-estimator 216 may utilize other estimation procedures, such as but not limited to a Least Squares estimation procedure, a Serial Interface Cancellation (SIC) procedure, etc. Subsequently, CIR re-estimator 216 communicates the data signal-based CIR estimate to the $\hat{H}$ reconstructor 208 and to equalizer 206. $\hat{H}$ reconstructor 208 may re-program a reconstruction filter, and equalizer 206 may re-program a tap delay line filter, at least in part based on a value of the data signal-based CIR estimate. Moreover, in some aspects of the present apparatus and methods, $\hat{H}$ reconstructor 208 and to equalizer 206, or CIR re-estimator 216 and CIR estimator 215, may apply weights to the respective values of the data signal-aided CIR estimate and the pilot signal-based CIR estimate, allowing for a combined CIR estimate to be utilized to update $\hat{H}$ reconstructor 208 and to equalizer 206.

In one non-limiting example, the data-aided channel impulse response algorithm used by CIR re-estimator 216 may be configured to evaluate one or more equations in the process of determining the data signal-based CIR estimate. In an aspect, one or more of these equations may depend upon one or more of the following functions:

x(n): Data signal, e.g., sequence of chips, transmitted by the network entity h(k): $k^{th}$ tap of a wireless channel from the network entity to the UE y(n): Sequence of chips received at the UE w(n): Additive thermal noise/interference from other cells received at the UE z(n): Chip sequence at transmit RAM (an estimate of x(n))

In the above functions, the parameter n may represent an iteration number associated with a particular iteration. Also, any character in the following discussion not explicitly defined here may have a similar definition as the same character discussed above. Furthermore, any function or term herein that contains an asterisk notation (e.g., z*(n)) may represent the complex conjugate of the corresponding non-asterisk function (e.g., z(n)).

Moreover, referring back to FIG. 2, it should be noted that: transmitted signal as transmitted by network entity 104 may be represented by x(n), and the channel over which the transmitted signal is sent may be represented by h(k); the received signal as received at antenna 201 may be represented by y(n), which includes, approximately, x(n)+w(n), or in other words, antenna 201 receives the transmitted signal along with other noise and interference; and the transmitted signal estimate output from symbol processor 212 and stored at transmit RAM 210 may be represented by z(n).

Continuing with the example of the data-aided channel impulse response algorithm used by CIR re-estimator 216, according to an aspect of the present disclosure, the correlation of y(n) and z(n) may be represented by the following equation:

$$E[y(n+l)z^*(n)] = E\left[\sum_{k=0}^{K-1} h(k)x(n+l-k)z^*(n) + w(n+l)z^*(n)\right]$$

Furthermore, the CIR re-estimator 216 may be configured to assume, in some examples, that the equalized chips and noise are uncorrelated. In these examples, the above equation may be reduced and rewritten as:

$$E[y(n+l)z^*(n)] = \sum_{k=0}^{K-1} h(k)E[x(n+l-k)z^*(n)] + 0$$

In an additional aspect, in some examples, the chips comprising chip sequence z(n) (and/or any other chip sequence) may be scrambled using a long pseudo-noise (PN) sequence. In such examples, the CIR re-estimator 216 may be configured to assume that z(n) is an uncorrelated chip sequence, such that E[x(m)z*(n)]=δ(m−n). Furthermore, this assumption may be more accurate when a subject signal and its corresponding chip sequence x(m) are transmitted by a network entity 104 to the UE 102 via a data channel exhibiting a high signal-to-noise ratio than when transmitted on a channel exhibiting a low signal-to-noise ratio. Applying this assumption, the previous equation may be rewritten as:

$$E[y(n+l)z^*(n)] = \sum_{k=0}^{K-1} h(k)\delta(l-k)$$

Next, the CIR re-estimator 216 may be configured to compute a cross-correlation between two signals and/or signal estimates to generate the data signal-aided CIR estimate. For example, in an aspect, CIR re-estimator 216 may compute the cross-correlation of z(n) and y(n), which may generate the estimated CIR, which may be represented as:

$$R_{yz}(l) \approx h(l)$$

Once the CIR re-estimator 216 completes the data signal-aided CIR estimate (or re-estimated CIR) for a particular iteration, it may output the data signal-aided CIR estimate to a filter/cleaner component 218, which may be configured to filter, threshold, and/or clean the inputted data signal-aided CIR estimate. In some examples, the filter/cleaner component 218 may comprise a one-pole infinite impulse response (IIR) filter, which may alter the position of its pole based on a UE speed. Thereafter, the filter/cleaner component 218 may output filtered/cleaned data signal-aided CIR estimate to $\hat{H}$ reconstructor 208. In some aspects, the data signal-aided CIR estimate may be used to intermittently reprogram $\hat{H}$ reconstructor 208, for example, once per iteration. In addition, in some examples, the data signal-aided CIR estimate derived from a received data signal 112 may be linearly combined with the pilot signal-based CIR estimate that is based on received pilot signal 110, wherein in some aspect each estimate may be weighted, to create a combined CIR estimate, which may be utilized by signal enhancement component 106 for interference cancellation, reconstruction filter programming, and/or subsequent signal equalization.

Referring back to FIG. 2, signal enhancement component 106 may be configured to control a switch 211, such that once a given number of iterations or performed, or once received signal, y(n), has achieved a sufficient quality, the received signal is forwarded to descrambler/despreader 213. Descrambler/despreader 213 is configured to apply descrambling/despreading algorithms to the signal, and output the result to decoder 214. Decoder 214 includes one or more decoding algorithms for decoding the signal received from descrambler/despreader 213, with the result being available for further processing on UE 102.

Figure 3:
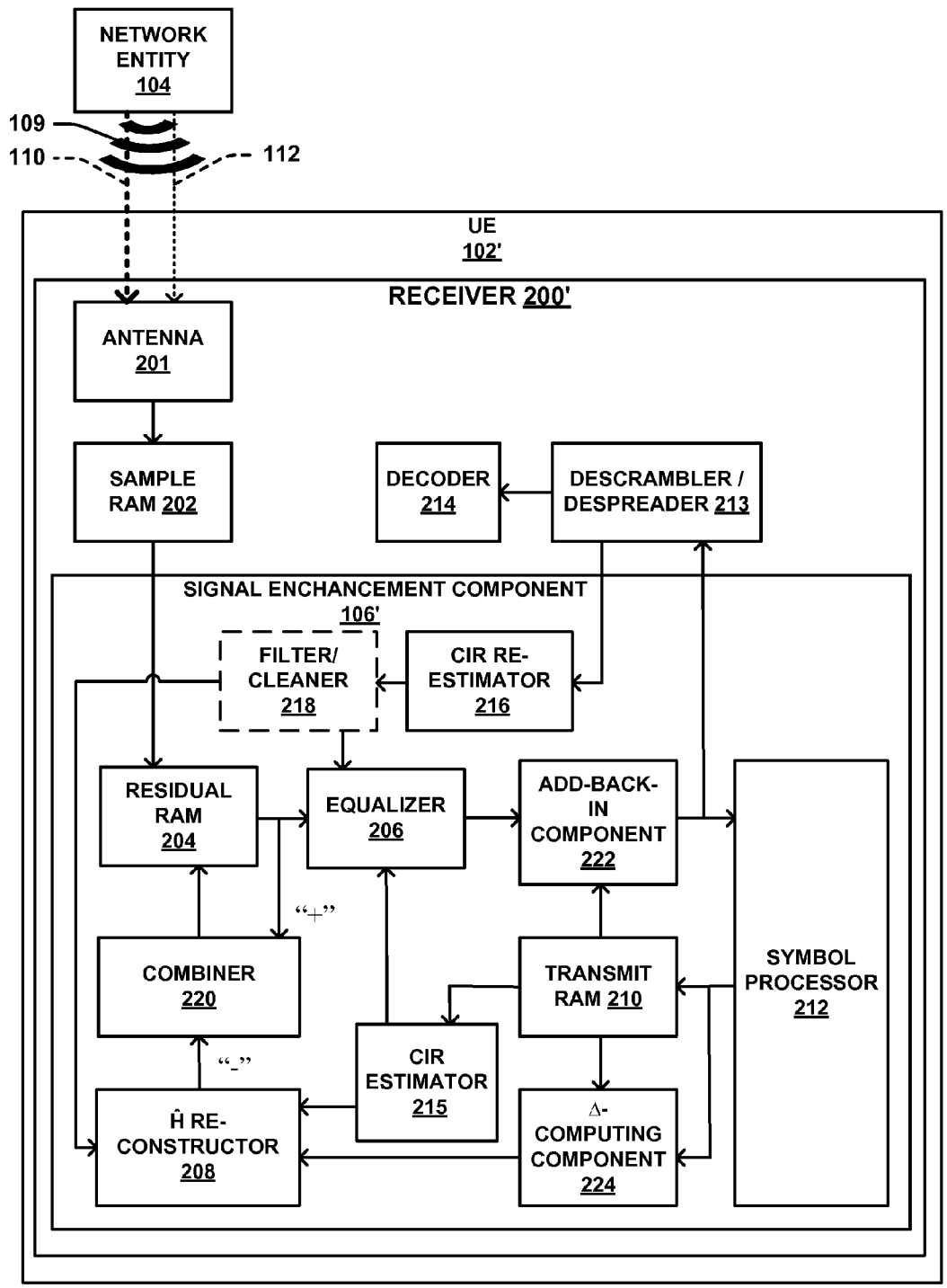
FIG. 3 is a block diagram illustrating a detailed example of a user equipment and its components in another example wireless communications system according to aspects of the present disclosure.

FIG. 3 illustrates an alternative or additional example of a wireless communication system (e.g., system 100 of FIG. 1) containing UE 102' configured to perform data-signal-based CIR and/or data channel estimation. In an aspect, the UE 102', receiver 200' and related signal enhancement component 106' may be essentially similar to UE 102, receiver 200 and signal enhancement component 106 of FIG. 2. However, UE 102', receiver 200' and related signal enhancement component 106' may differ from the example of FIG. 2 in at least that the data that serves as the input to decoder 214—namely, the output of descrambler/despreader 213 in some examples—may serve as the data upon which a CIR estimation (or re-estimation) is based instead of the output of transmit RAM 210 as in previous examples presented in reference to FIG. 2. Though the input of decoder 214 may differ between the UE 102 of FIG. 2 and UE 102' of FIG. 3, the functionality and structure of any FIG. 2 components that are repeated in FIG. 3 do not differ for purposes of the present disclosure, unless otherwise noted herein.

Furthermore, in a non-limiting aspect, the symbol processor 212 may not generate a completed output until all iterations associated with a particular data set (e.g., once per data block.) are complete. As such, according to aspects of the system of FIG. 3, the data signal-aided CIR estimate associated with a data channel, and, optionally, the pilot signal-based CIR estimate, may be estimated and/or updated for a subsequent data block (e.g., the immediately following data block) after all iterations of a given CIR estimation based on a current data block have finished. This differs from the functionality of the UE 102 and signal enhancement component 106 of examples presented in FIG. 2, where the CIR estimation and updating procedure may be performed during or after each of a plurality of iterations.

Figure 4:
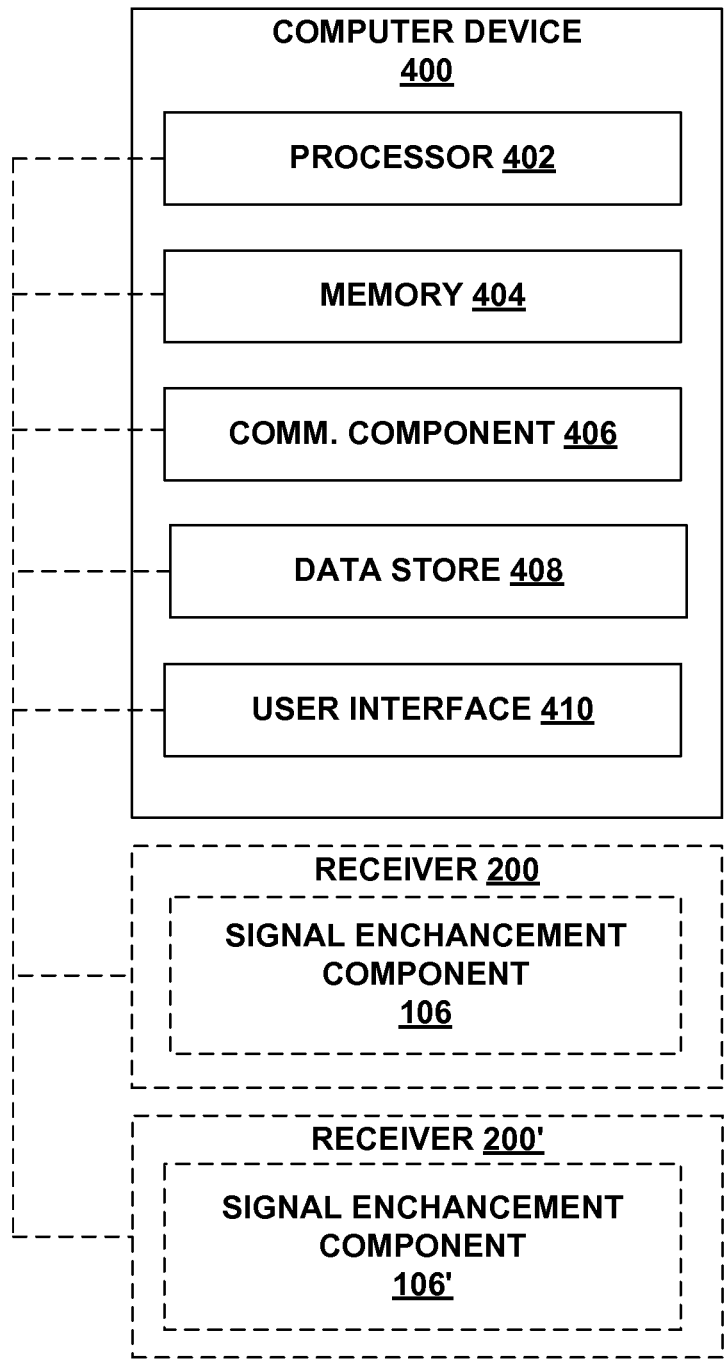
FIG. 4 is a block diagram illustrating example components of a computer device according to the present disclosure.

Referring to FIG. 4, in one aspect, UE 102 AND 102' and/or network device 104 of FIGS. 1-3 may be represented by a specially programmed or configured computer device 400. For example, for implementation as UE 102 or 102' (FIGS. 1, 2, and 3), computer device 400 may include receiver 200 or 200' and signal enhancement component 106 or 106' (FIGS. 1, 2, and 3), such as in specially programmed computer readable instructions or code, firmware, hardware, or some combination thereof. Further, for example, for implementation as network device 104 (FIGS. 1, 2, and 3), computer device 400 may include one or more components for generating and/or transmitting signal 109, including a pilot signal 110 (FIGS. 1, 2, and 3) and one or more data signals 112 (FIGS. 1, 2, and 3), such as in specially programmed computer readable instructions or code, firmware, hardware, or some combination thereof Computer device 400 includes a processor 402 for carrying out processing functions associated with one or more of components and functions described herein. Processor 402 can include a single or multiple set of processors or multi-core processors. Moreover, processor 402 can be implemented as an integrated processing system and/or a distributed processing system.

Computer device 400 further includes a memory 404, such as for storing data used herein and/or local versions of applications being executed by processor 402. Memory 404 can include any type of memory usable by a computer, such as random access memory (RAM), read only memory (ROM), tapes, magnetic discs, optical discs, volatile memory, non-volatile memory, and any combination thereof.

Further, computer device 400 includes a communications component 406 that provides for establishing and maintaining communications with one or more parties utilizing hardware, software, and services as described herein. Communications component 406 may carry communications between components on computer device 400, as well as between computer device 400 and external devices, such as devices located across a communications network and/or devices serially or locally connected to computer device 400. For example, communications component 406 may include one or more buses, and may further include transmit chain components and receive chain components associated with a transmitter and receiver, respectively, or a transceiver, operable for interfacing with external devices. In an additional aspect, communications component 406 may be configured to receive one or more pages from one or more subscriber networks. In a further aspect, such a page may correspond to the second subscription and may be received via the first technology type communication services.

Additionally, computer device 400 may further include a data store 408, which can be any suitable combination of hardware and/or software, that provides for mass storage of information, databases, and programs employed in connection with aspects described herein. For example, data store 408 may be a data repository for applications not currently being executed by processor 402 and/or any threshold values or finger position values.

Computer device 400 may additionally include a user interface component 410 operable to receive inputs from a user of computer device 400, and further operable to generate outputs for presentation to the user. User interface component 410 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

Figure 5:
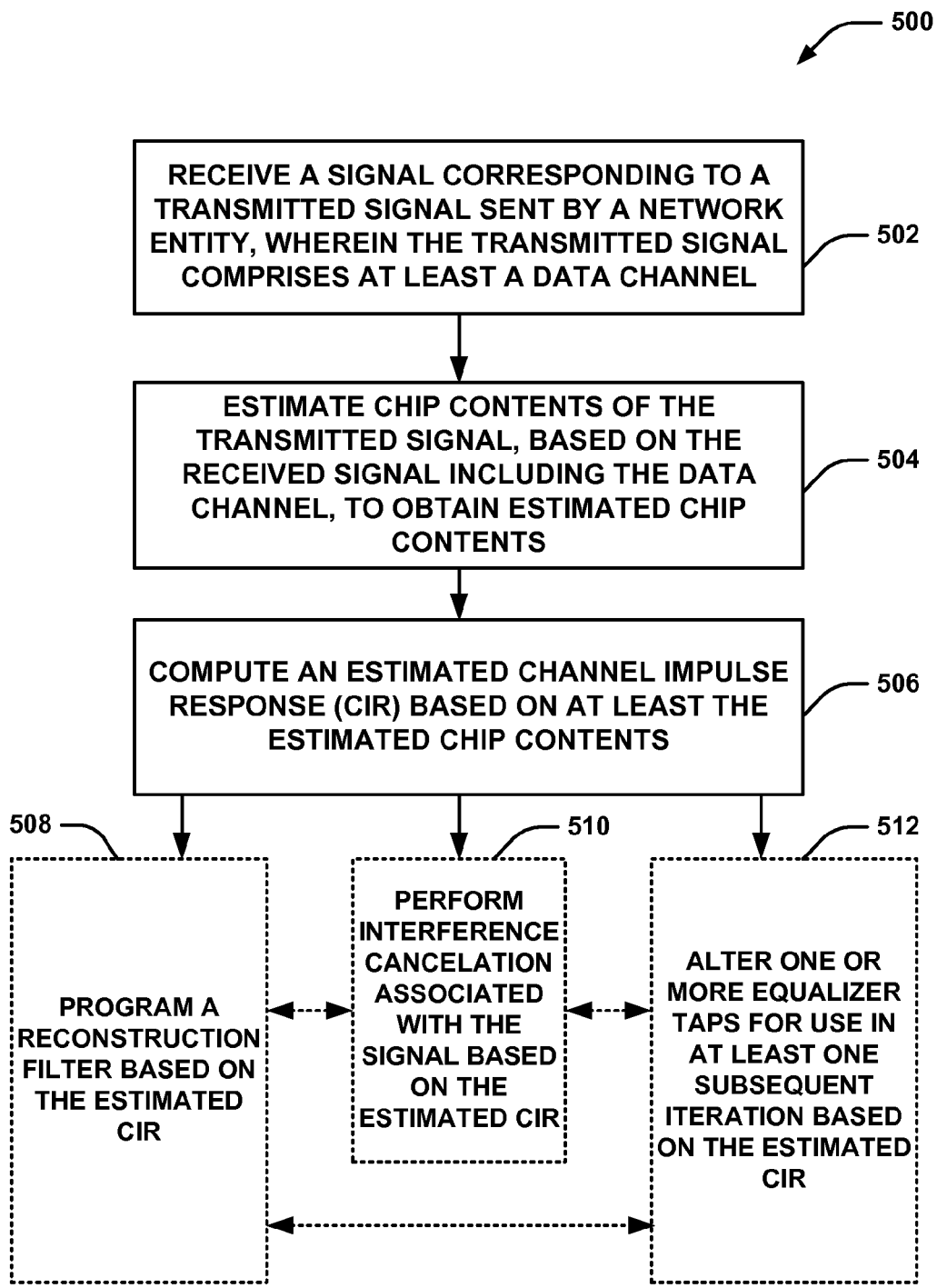
FIG. 5 is a flow diagram illustrating aspects of a method for improved signal optimization based on an estimated CIR according to aspects of the present disclosure.

FIG. 5 illustrates an example methodology 500 for improved CIR estimation in a UE (e.g. UE 102 or 102' of FIGS. 1-4) based on a received signal. In an aspect, at block 502, the UE and/or a component therein (e.g. receiver 200 or 200' of FIGS. 2-4) may receive a signal corresponding to a transmitted signal sent by a network entity, wherein the transmitted signal comprises at least a data channel. In addition, in some aspects, at block 504, the UE and/or a component therein (e.g. receiver 200 or 200' and their components, such as one or more of equalizer 206, add-back-in component 222, and symbol processor 212 of FIGS. 2 and 3) may estimate chip contents of the transmitted signal, based on the received signal including the data channel, to obtain estimated chip contents. This estimation, in some aspects, may further include adding an equalized version of the received signal to previous estimates of the received signal, which may be stored in a memory or buffer in the UE 102 or 102' (e.g.

Transmit RAM 210 of FIGS. 2 and 3). Furthermore, the UE and/or a component therein (e.g. CIR re-estimator 216 and/or filter/cleaner 218 of FIGS. 2 and 3) may compute an estimated channel impulse response (CIR) based on at least the estimated chip contents at block 506.

Furthermore, based on the estimated CIR, the UE may reprogram, update, or otherwise adjust the operation of one or more components of the UE for subsequent iterations of signal optimization that the UE may perform. For example, the UE or a component therein (e.g. signal enhancement component 106 of FIGS. 1-3 or processor 402 of FIG. 4) may program a reconstruction filter based on the estimated CIR at block 508. Furthermore, the UE (e.g. via signal enhancement component 106 of FIG. 1-3) may additionally or alternatively perform interference cancellation associated with the signal based on the estimated CIR at block 510. In addition or in alternative, the UE (e.g. via equalizer 206 of FIGS. 2 and 3 or processor 402) may alter one or more equalizer taps for use in at least one subsequent iteration based on the estimated CIR at block 512.

Figure 6:
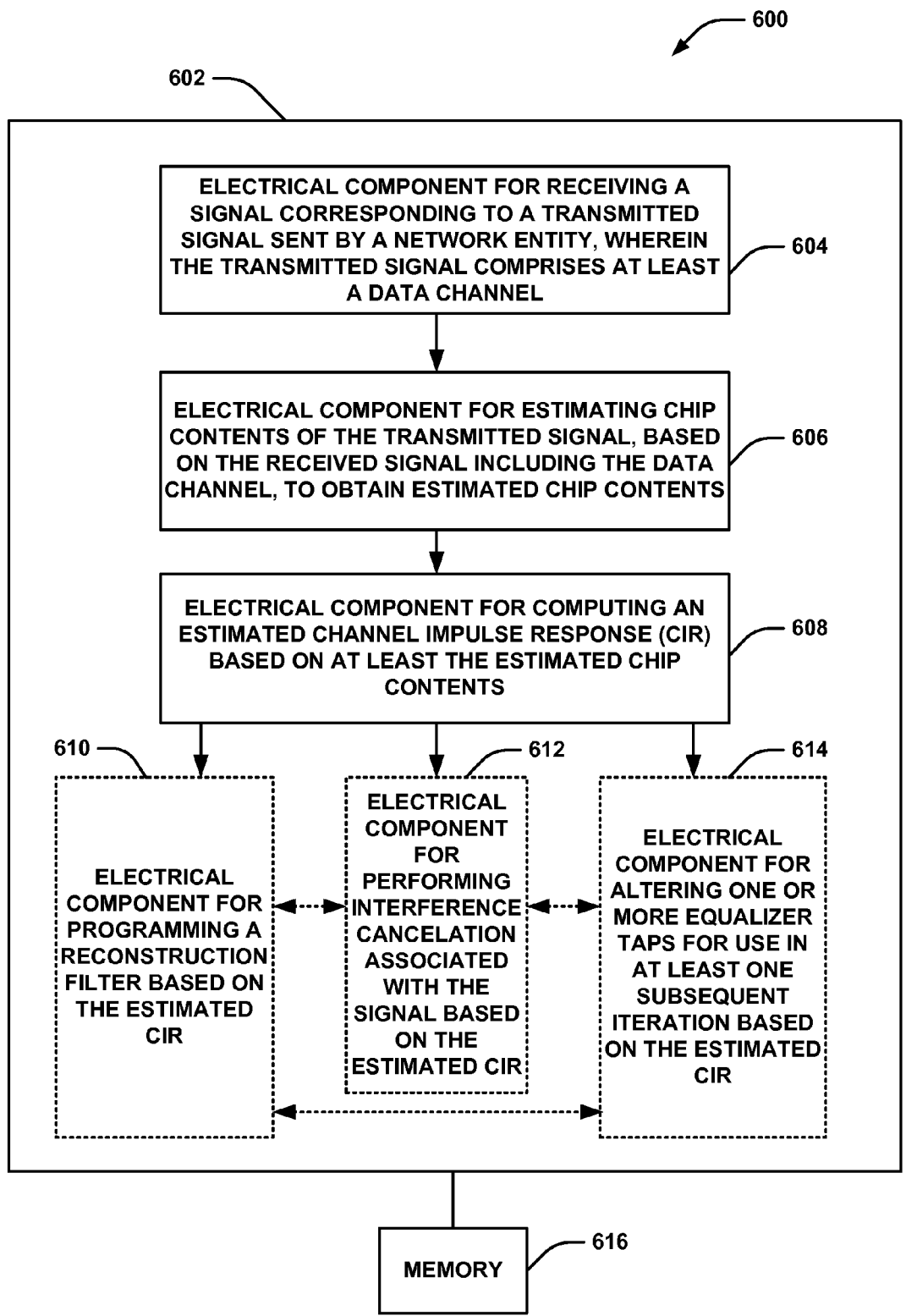
FIG. 6 is a component diagram illustrating aspects of a logical grouping of electrical components as contemplated by the present disclosure.

Referring to FIG. 6, an example system 600 is displayed for improved CIR estimation and signal and communication optimization based in the estimated CIR. For example, system 600 can reside at least partially within one or more of UE 102 or 102' (or network entity 104) of FIGS. 14. It is to be appreciated that system 600 is represented as including functional blocks, which can be functional blocks that represent functions implemented by a processor, software, or combination thereof (e.g., firmware). For example, system 600 may be implemented via processor 402, memory 404 communications component 406 and data store 408 of FIG. 4, by for example, processor 404 executing software stored by data store 408.

System 600 includes a logical grouping 602 of electrical components that can act in conjunction. For instance, logical grouping 602 can include an electrical component 604 for receiving a signal corresponding to a transmitted signal sent by a network entity, wherein the transmitted signal comprises at least a data channel. In an aspect, electrical component 604 may comprise receiver 202 (FIGS. 2 and 3) and/or communications component 406 (FIG. 4). Additionally, logical grouping 602 can include an electrical component 606 for estimating chip contents of the transmitted signal, based on the received signal including the data channel, to obtain estimated chip contents. In an aspect, electrical component 606 may comprise signal enhancement component 106 (FIGS. 1-3). In an additional aspect, logical grouping 602 can include an electrical component 608 for computing an estimated channel impulse response (CIR) based on at least the estimated chip contents. In an aspect, electrical component 608 may comprise CIR re-estimator 216 (FIGS. 2-3). Furthermore, logical grouping 602 can include an electrical component 610 for programming a reconstruction filter based on the estimated CIR. In an aspect, for example, processor 402 (FIG. 4) can implement electrical component 610. Furthermore, logical grouping 602 can include an electrical component 612 for performing interference cancellation associated with the signal based on the estimated CIR. In an aspect, processor 402 (FIG. 4) can implement electrical component. Furthermore, logical grouping 602 can include an electrical component 614 for altering one or more equalizer taps for use in at least one subsequent iteration based on the estimated CIR. In an aspect, electrical component 614 may comprise equalizer 206 (FIGS. 2-3) or processor 402 (FIG. 4) can implement electrical component 614. Thus, electrical components 604, 606, 608, 610, 612, and 614 may correspond to one or more components in FIGS. 2, 3, and 4, and such components may be separate physical components, components implemented by processor 402 or a combination thereof.

Additionally, system 600 can include a memory 616 that retains instructions for executing functions associated with the electrical components 604, 606, 608, 610, 612, and 614, stores data used or obtained by the electrical components 604, 606, 608, 610, 612, and 614, etc. While shown as being external to memory 616, it is to be understood that one or more of the electrical components 604, 606, 608, 610, 612, and 614 can exist within memory 616. In one example, electrical components 604, 606, 608, 610, 612, and 614 can comprise at least one processor, or each electrical component 604, 606, 608, 610, 612, and 614 can be a corresponding module of at least one processor. Moreover, in an additional or alternative example, electrical components 604, 606, 608, 610, 612, and 614 can be a computer program product including a computer readable medium, where each electrical component 604, 606, 608, 610, 612, and 614 can be corresponding code.

Figure 7:
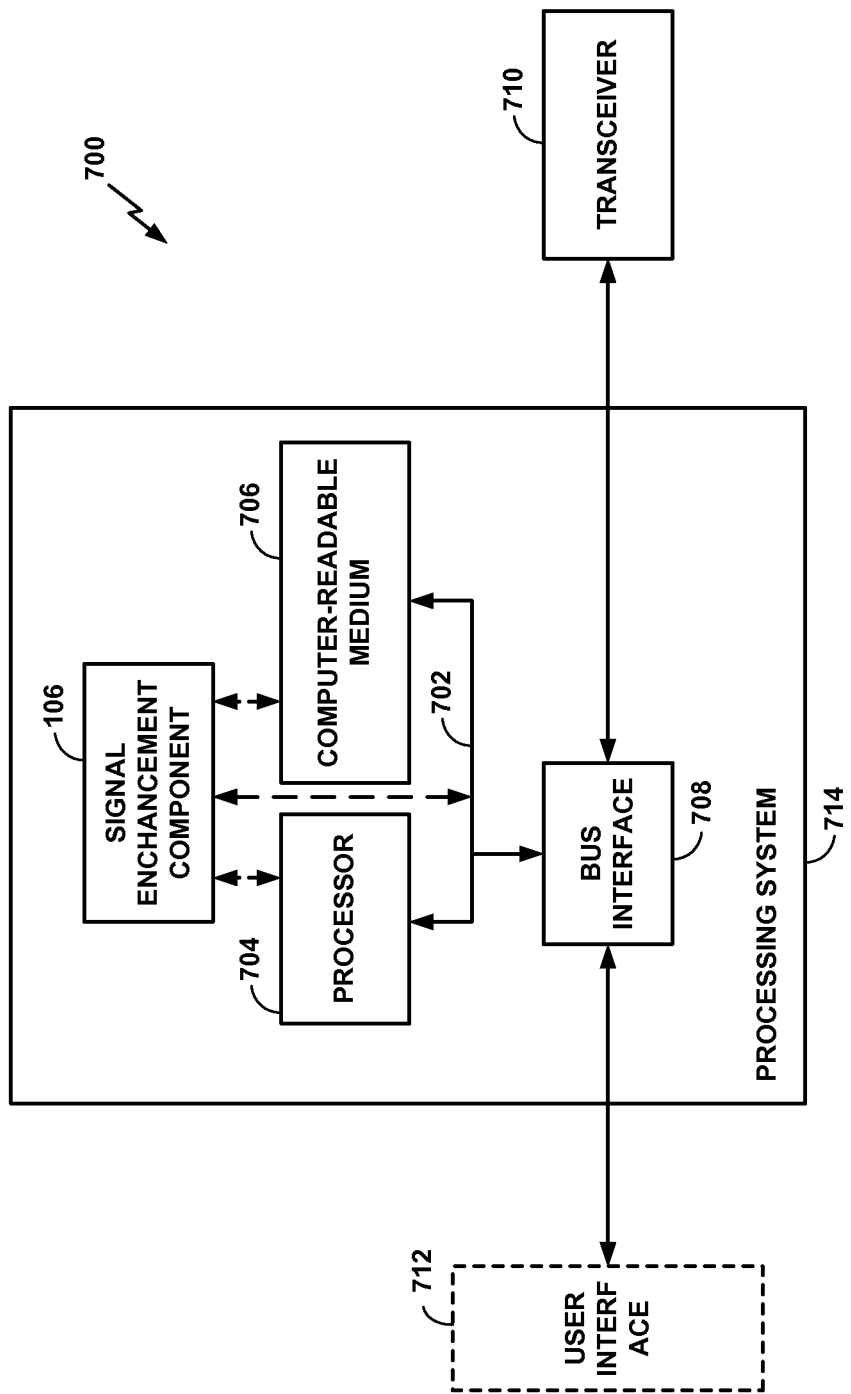
FIG. 7 is a block diagram illustrating an example of a hardware implementation for an apparatus employing a processing system.

FIG. 7 is a block diagram illustrating an example of a hardware implementation for an apparatus 700 employing a processing system 714 for carrying out enhanced CIR estimation aspects of the present disclosure, such as for implementing receiver 200 or 200' and signal enhancement component 106 or 106' (FIGS. 1-4). In this example, the processing system 714 may be implemented with a bus architecture, represented generally by a bus 702. The bus 702 may include any number of interconnecting buses and bridges depending on the specific application of the processing system 714 and the overall design constraints. The bus 702 links together various circuits including one or more processors, represented generally by the processor 704, computer-readable media, represented generally by the computer-readable storage medium 706, and one or more components described herein, such as, but not limited to, signal enhancement component 106 (FIGS. 1-3). The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium. Depending upon the nature of the apparatus, a user interface 712 (e.g., keypad, display, speaker, microphone, joystick) may also be provided.

Figure 8:
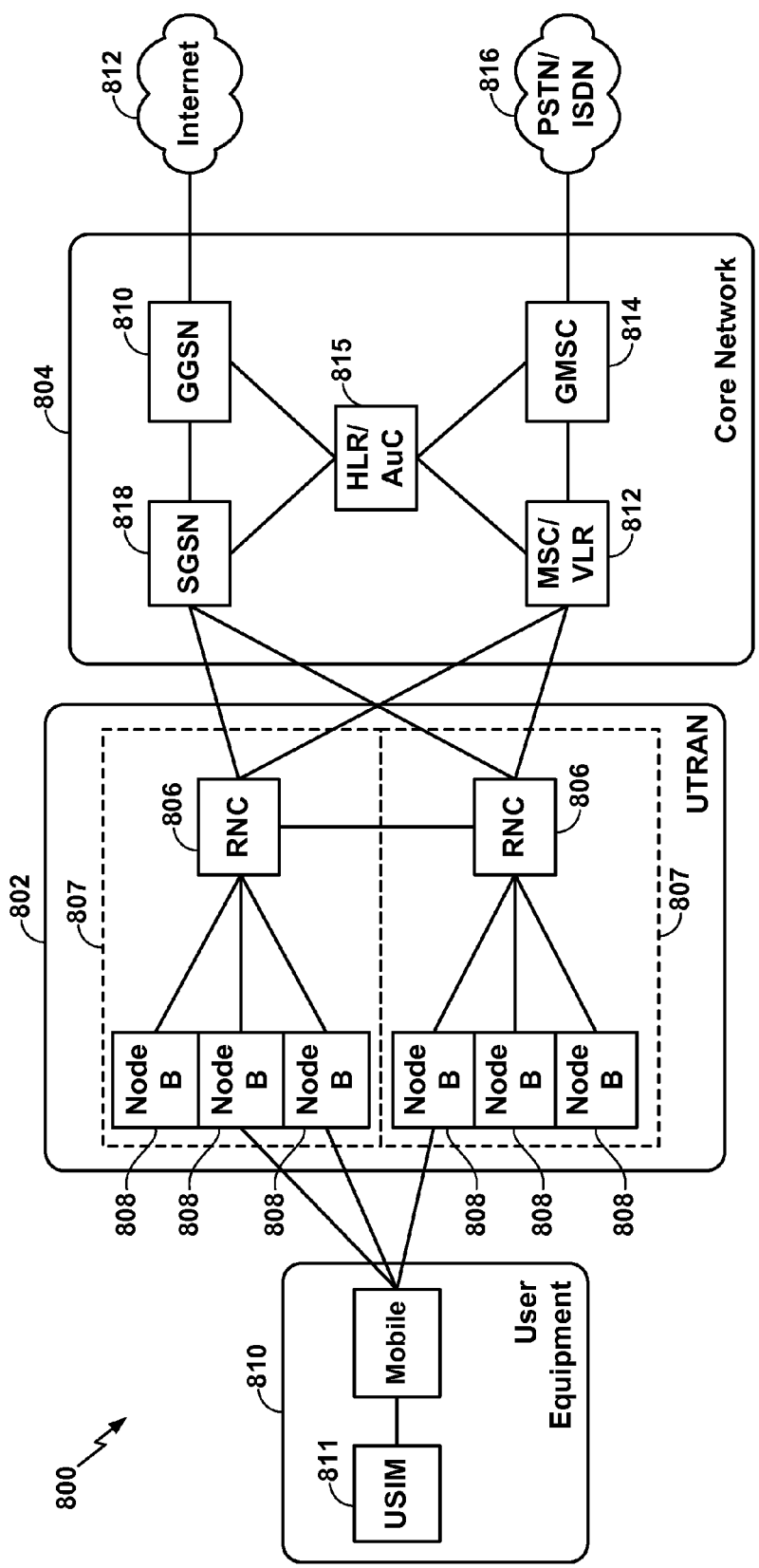
FIG. 8 is a block diagram conceptually illustrating an example of a telecommunications system.

The processor 704 is responsible for managing the bus 702 and general processing, including the execution of software stored on the computer-readable storage medium 706. The software, when executed by the processor 704, causes the processing system 714 to perform the various functions described infra for any particular apparatus. The computer-readable storage medium 706 may also be used for storing data that is manipulated by the processor 704 when executing software. Thus, signal enhancement component 106 may be a separate physical component, or a component implemented by processor 704 or stored in computer-readable storage medium 706, or a combination thereof The various concepts presented throughout this disclosure may be implemented across a broad variety of telecommunication systems, network architectures, and communication standards. By way of example and without limitation, the aspects of the present disclosure illustrated in FIG. 8 are presented with reference to a UMTS system 800 employing a WCDMA air interface. A UMTS network includes three interacting domains: a Core Network (CN) 804, a UMTS Terrestrial Radio Access Network (UTRAN) 802, and User Equipment (UE) 810. In an aspect, UE 810 may be UE 102

(FIG. 1) and may be configured to perform data-signal-based CIR estimation and signal optimization according to the aspects of the present disclosure. In this example, the UTRAN 802 provides various wireless services including telephony, video, data, messaging, broadcasts, and/or other services. The UTRAN 802 may include a plurality of Radio Network Subsystems (RNSs) such as an RNS 807, each controlled by a respective Radio Network Controller (RNC) such as an RNC 806. Here, the UTRAN 802 may include any number of RNCs 806 and RNSs 807 in addition to the RNCs 806 and RNSs 807 illustrated herein. The RNC 806 is an apparatus responsible for, among other things, assigning, reconfiguring, and releasing radio resources within the RNS 807. The RNC 806 may be interconnected to other RNCs (not shown) in the UTRAN 802 through various types of interfaces such as a direct physical connection, a virtual network, or the like, using any suitable transport network.

Communication between a UE 810 and a NodeB 808 may be considered as including a physical (PHY) layer and a medium access control (MAC) layer. Further, communication between a UE 810 and an RNC 806 by way of a respective NodeB 808 may be considered as including a radio resource control (RRC) layer. In the instant specification, the PHY layer may be considered layer 1; the MAC layer may be considered layer 7; and the RRC layer may be considered layer 3. Information herein below utilizes terminology introduced in the RRC Protocol Specification, 3GPP TS 75.331 v9.1.0, incorporated herein by reference.

The geographic region covered by the RNS 807 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 808 are shown in each RNS 807; however, the RNSs 807 may include any number of wireless Node Bs. The Node Bs 808 provide wireless access points to a CN 804 for any number of mobile apparatuses, and may be the network entity of FIGS. 1-3. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 810 may further include a universal subscriber identity module (USIM) 811, which contains a user's subscription information to a network. For illustrative purposes, one UE 810 is shown in communication with a number of the Node Bs 808. The DL, also called the forward link, refers to the communication link from a NodeB 808 to a UE 810, and the UL, also called the reverse link, refers to the communication link from a UE 810 to a NodeB 808.

The CN 804 interfaces with one or more access networks, such as the UTRAN 802. As shown, the CN 804 is a GSM core network. However, as those skilled in the art will recognize, the various concepts presented throughout this disclosure may be implemented in a RAN, or other suitable access network, to provide UEs with access to types of CNs other than GSM networks.

The CN 804 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 804 supports circuit-switched services with a MSC 812 and a GMSC 814. In some applications, the GMSC 814 may be referred to as a media gateway (MGW). One or more RNCs, such as the RNC 806, may be connected to the MSC 812. The MSC 812 is an apparatus that controls call setup, call routing, and UE mobility functions. The MSC 812 also includes a VLR that contains subscriber-related information for the duration that a UE is in the coverage area of the MSC 812. The GMSC 814 provides a gateway through the MSC 812 for the UE to access a circuit-switched network 816. The GMSC 814 includes a home location register (HLR) 815 containing subscriber data, such as the data reflecting the details of the services to which a particular user has subscribed. The HLR is also associated with an authentication center (AuC) that contains subscriber-specific authentication data. When a call is received for a particular UE, the GMSC 814 queries the HLR 815 to determine the UE's location and forwards the call to the particular MSC serving that location.

The CN 804 also supports packet-data services with a serving GPRS support node (SGSN) 818 and a gateway GPRS support node (GGSN) 820. GPRS, which stands for General Packet Radio Service, is designed to provide packet-data services at speeds higher than those available with standard circuit-switched data services. The GGSN 820 provides a connection for the UTRAN 802 to a packet-based network 822. The packet-based network 822 may be the Internet, a private data network, or some other suitable packet-based network. The primary function of the GGSN 820 is to provide the UEs 810 with packet-based network connectivity. Data packets may be transferred between the GGSN 820 and the UEs 810 through the SGSN 818, which performs primarily the same functions in the packet-based domain as the MSC 812 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" WCDMA air interface for UMTS is based on such direct sequence spread spectrum technology and additionally calls for a frequency division duplexing (FDD). FDD uses a different carrier frequency for the UL and DL between a NodeB 808 and a UE 810. Another air interface for UMTS that utilizes DS-CDMA, and uses time division duplexing (TDD), is the TD-SCDMA air interface. Those skilled in the art will recognize that although various examples described herein may refer to a WCDMA air interface, the underlying principles may be equally applicable to a TD-SCDMA air interface.

An HSPA air interface includes a series of enhancements to the 3G/WCDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its data channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 810 provides feedback to the node B 808 over the HS-DPCCH to indicate whether it correctly decoded a packet on the downlink.

HS-DPCCH further includes feedback signaling from the UE 810 to assist the node B 808 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 808 and/or the UE 810 may have multiple antennas supporting MIMO technology. The use of MIMO technology enables the node B 808 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 810 to increase the data rate or to multiple UEs 810 to increase the overall system capacity. This is achieved by spatially precoding each data stream and then transmitting each spatially precoded stream through a different transmit antenna on the downlink. The spatially precoded data streams arrive at the UE(s) 810 with different spatial signatures, which enables each of the UE(s) 810 to recover the one or more the data streams destined for that UE 810. On the uplink, each UE 810 may transmit one or more spatially precoded data streams, which enables the node B 808 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 9:
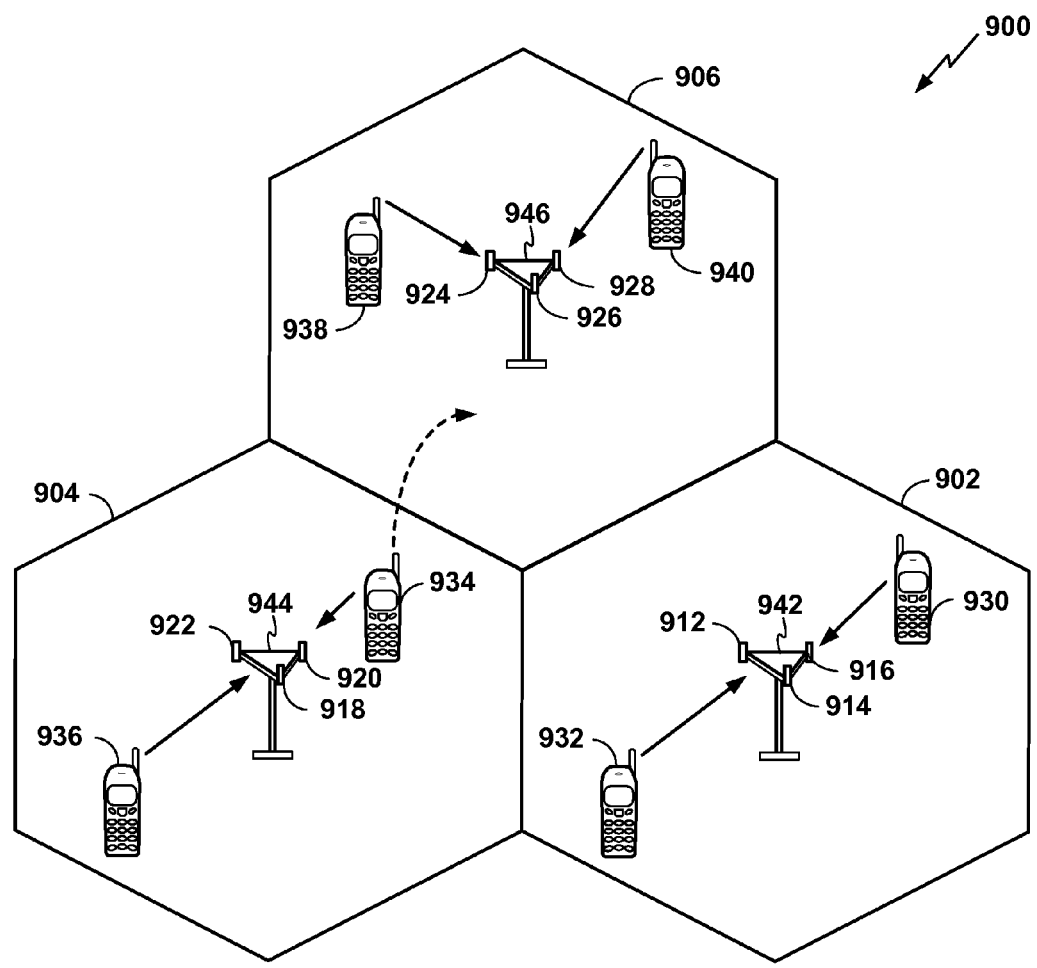
FIG. 9 is a conceptual diagram illustrating an example of an access network.

Referring to FIG. 9, an access network 900 in a UTRAN architecture is illustrated. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices, e.g., User Equipment or UEs, which may be in communication with one or more sectors of each cell 902, 904 or 906. For example, UEs 930 and 932 may be in communication with NodeB 942, UEs 934 and 936 may be in communication with NodeB 944, and UEs 938 and 940 can be in communication with NodeB 946. Here, each NodeB 942, 944, 946 is configured to provide an access point to a CN 804 (FIG. 8) for all the UEs 930, 932, 934, 936, 938, 940 in the respective cells 802, 804, and 806. Additionally, each NodeB 942, 944, 946 may be network entity 104 (FIGS. 1-3) and UEs 930, 932, 934, 936, 938, 940 may be UE 102 (FIGS. 1-3) and may perform the methods outlined herein.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a radio network controller 806 (FIG. 8), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (WCDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 10:
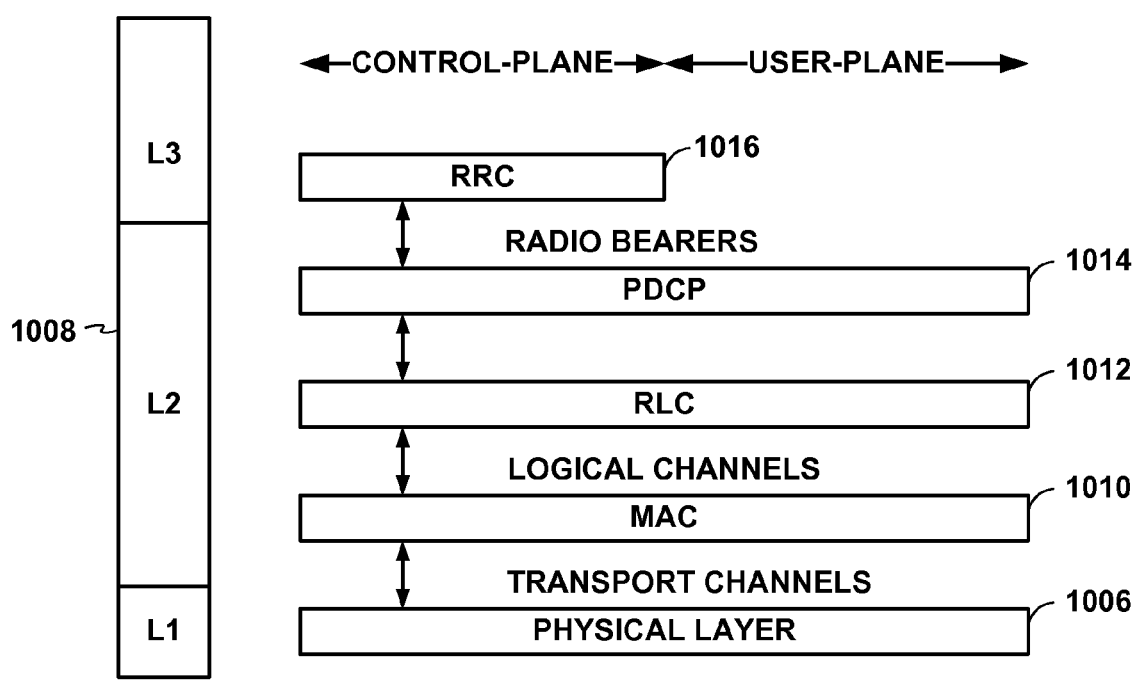
FIG. 10 is a conceptual diagram illustrating an example of a radio protocol architecture for the user and control plane.

The radio protocol architecture may take on various forms depending on the particular application. An example for an HSPA system will now be presented with reference to FIG. 10. FIG. 10 is a conceptual diagram illustrating an example of the radio protocol architecture for the user and control planes.

Turning to FIG. 10, the radio protocol architecture for the UE and node B is shown with three layers: Layer 1, Layer 2, and Layer 3. Layer 1 is the lowest lower and implements various physical layer signal processing functions. Layer 1 will be referred to herein as the physical layer 1006. Layer 2 (L2 layer) 1008 is above the physical layer 1006 and is responsible for the link between the UE and node B over the physical layer 1006.

In the user plane, the L2 layer 1008 includes a media access control (MAC) sublayer 1010, a radio link control (RLC) sublayer 1012, and a packet data convergence protocol (PDCP) 1014 sublayer, which are terminated at the node B on the network side. Although not shown, the UE may have several upper layers above the L2 layer 1008 including a network layer (e.g., IP layer) that is terminated at a PDN gateway on the network side, and an application layer that is terminated at the other end of the connection (e.g., far end UE, server, etc.).

The PDCP sublayer 1014 provides multiplexing between different radio bearers and logical channels. The PDCP sublayer 1014 also provides header compression for upper layer data packets to reduce radio transmission overhead, security by ciphering the data packets, and handover support for UEs between NodeBs. The RLC sublayer 1012 provides segmentation and reassembly of upper layer data packets, retransmission of lost data packets, and reordering of data packets to compensate for out-of-order reception due to hybrid automatic repeat request (HARQ). The MAC sublayer 1010 provides multiplexing between logical and data channels. The MAC sublayer 1010 is also responsible for allocating the various radio resources (e.g., resource blocks) in one cell among the UEs. The MAC sublayer 1010 is also responsible for HARQ operations.

Figure 11:
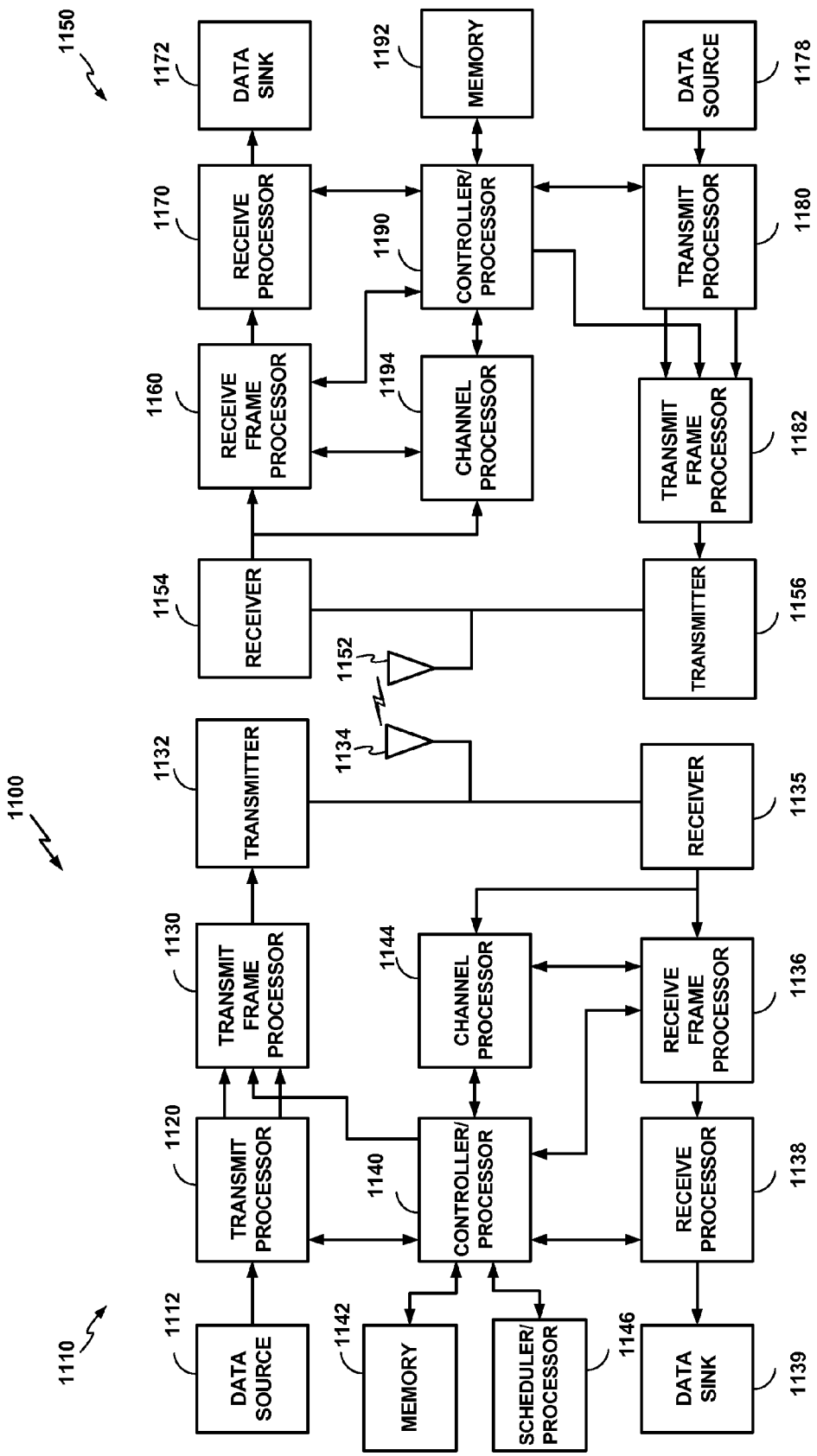
FIG. 11 is a block diagram conceptually illustrating an example of a NodeB in communication with a UE in a telecommunications system.

FIG. 11 is a block diagram of a NodeB 1110 in communication with a UE 1150, where the NodeB 1110 may be the NodeB 1108 in FIG. 11, network entity 104 (FIGS. 1-3), and the UE 1050 may be UE 102 of FIGS. 1-3. In the downlink communication, a transmit processor 1120 may receive data from a data source 1112 and control signals from a controller/processor 1140. The transmit processor 1120 provides various signal processing functions for the data and control signals, as well as reference signals (e.g., pilot signals). For example, the transmit processor 1120 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1144 may be used by a controller/processor 1140 to determine the coding, modulation, spreading, and/or scrambling schemes for the transmit processor 1120. These channel estimates may be derived from a reference signal transmitted by the UE 1150 or from feedback from the UE 1150. The symbols generated by the transmit processor 1120 are provided to a transmit frame processor 1130 to create a frame structure. The transmit frame processor 1130 creates this frame structure by multiplexing the symbols with information from the controller/processor 1140, resulting in a series of frames. The frames are then provided to a transmitter 1132, which provides various signal conditioning functions including amplifying, filtering, and modulating the frames onto a carrier for downlink transmission over the wireless medium through antenna 1134. The antenna 1134 may include one or more antennas, for example, including beam steering bidirectional adaptive antenna arrays or other similar beam technologies.

At the UE 1150, a receiver 1154 receives the downlink transmission through an antenna 1152 and processes the transmission to recover the information modulated onto the carrier. The information recovered by the receiver 1154 is provided to a receive frame processor 1160, which parses each frame, and provides information from the frames to a channel processor 1194 and the data, control, and reference signals to a receive processor 1170. The receive processor 1170 then performs the inverse of the processing performed by the transmit processor 1120 in the NodeB 1110. More specifically, the receive processor 1170 descrambles and despreads the symbols, and then determines the most likely signal constellation points transmitted by the NodeB 1110 based on the modulation scheme. These soft decisions may be based on channel estimates computed by the channel processor 1194. The soft decisions are then decoded and deinterleaved to recover the data, control, and reference signals. The CRC codes are then checked to determine whether the frames were successfully decoded. The data carried by the successfully decoded frames will then be provided to a data sink 1172, which represents applications running in the UE 1150 and/or various user interfaces (e.g., display). Control signals carried by successfully decoded frames will be provided to a controller/processor 1190. When frames are unsuccessfully decoded by the receiver processor 1170, the controller/processor 1190 may also use an acknowledgement (ACK) and/or negative acknowledgement (NACK) protocol to support retransmission requests for those frames.

In the uplink, data from a data source 1178 and control signals from the controller/processor 1190 are provided to a transmit processor 1180. The data source 1178 may represent applications running in the UE 1150 and various user interfaces (e.g., keyboard). Similar to the functionality described in connection with the downlink transmission by the NodeB 1110, the transmit processor 1180 provides various signal processing functions including CRC codes, coding and interleaving to facilitate FEC, mapping to signal constellations, spreading with OVSFs, and scrambling to produce a series of symbols. Channel estimates, derived by the channel processor 1194 from a reference signal transmitted by the NodeB 1110 or from feedback contained in the midamble transmitted by the NodeB 1110, may be used to select the appropriate coding, modulation, spreading, and/or scrambling schemes. The symbols produced by the transmit processor 1180 will be provided to a transmit frame processor 1182 to create a frame structure. The transmit frame processor 1182 creates this frame structure by multiplexing the symbols with information from the controller/processor 1190, resulting in a series of frames. The frames are then provided to a transmitter 1156, which provides various signal conditioning functions including amplification, filtering, and modulating the frames onto a carrier for uplink transmission over the wireless medium through the antenna 1152.

The uplink transmission is processed at the NodeB 1110 in a manner similar to that described in connection with the receiver function at the UE 1150. A receiver 1135 receives the uplink transmission through the antenna 1134 and processes the transmission to recover the information modulated onto the carrier. The information recovered by the receiver 1135 is provided to a receive frame processor 1136, which parses each frame, and provides information from the frames to the channel processor 1144 and the data, control, and reference signals to a receive processor 1138. The receive processor 1138 performs the inverse of the processing performed by the transmit processor 1180 in the UE 1150. The data and control signals carried by the successfully decoded frames may then be provided to a data sink 1139 and the controller/processor, respectively. If some of the frames were unsuccessfully decoded by the receive processor, the controller/processor 1140 may also use an acknowledgement (ACK) and/or negative acknowledgement (NACK) protocol to support retransmission requests for those frames.

The controller/processors 1140 and 1190 may be used to direct the operation at the NodeB 1110 and the UE 1150, respectively. For example, the controller/processors 1140 and 1190 may provide various functions including timing, peripheral interfaces, voltage regulation, power management, and other control functions. The computer readable media of memories 1142 and 1192 may store data and software for the NodeB 1110 and the UE 1150, respectively. A scheduler/processor 1146 at the NodeB 1110 may be used to allocate resources to the UEs and schedule downlink and/or uplink transmissions for the UEs.

Several aspects of a telecommunications system have been presented with reference to a WCDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium. The computer-readable storage medium may be a non-transitory computer-readable storage medium. A non-transitory computer-readable storage medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable storage medium may also include, by way of example, a carrier wave, a transmission line, and any other suitable medium for transmitting software and/or instructions that may be accessed and read by a computer. The computer-readable storage medium may be resident in the processing system, external to the processing system, or distributed across multiple entities including the processing system. The computer-readable storage medium may be embodied in a computer-program product. By way of example, a computer-program product may include a computer-readable storage medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of enhanced received signal processing, comprising:
   receiving a data signal corresponding to a transmitted data signal sent by a network entity, wherein the transmitted data signal comprises at least a data channel;
   estimating chip contents of the transmitted data signal, based on the received data signal including the data channel, to obtain estimated chip contents;
   computing a data signal-aided channel impulse response (CIR) estimate based on at least the estimated chip contents;
   receiving a pilot signal broadcast by the network entity;
   computing a pilot signal-based CIR estimate based on the received pilot signal; and
   computing a combined CIR estimate by linearly combining the data signal-aided CIR estimate and the pilot signal-based CIR estimate, wherein the linearly combining comprises weighting the data signal-aided CIR estimate and the pilot signal-based CIR estimate.

2. The method of claim 1, further comprising programming a reconstruction filter based on the combined CIR estimate.

3. The method of claim 1, further comprising performing at least a portion of the method of claim 1 during each of one or more iterations associated with each of one or more data blocks of the signal.

4. The method of claim 1, further comprising performing at least a portion of the method of claim 1 once for each of one or more channels of the signal.

5. The method of claim 1, wherein computing the data signal-aided CIR estimate occurs during each of one or more iterations of processing the received signal.

6. The method of claim 1, wherein computing the data signal-aided CIR estimate comprises computing a cross-correlation of the estimated chip contents and at least the received data channel.

7. The method of claim 1, further comprising performing interference cancellation associated with the signal based on the combined CIR estimate.

8. The method of claim 1, further comprising altering one or more equalizer taps for use in at least one subsequent iteration based on the combined CIR estimate.

9. The method of claim 1, further comprising:
   ascertaining a mobility state associated with a respective user equipment (UE); and
   wherein computing the combined CIR estimate further comprises computing the combined CIR estimate as a function of the mobility state.

10. An apparatus for enhanced received signal processing, comprising:
    means for receiving a data signal corresponding to a transmitted data signal sent by a network entity, wherein the transmitted data signal comprises at least a data channel;
    means for estimating chip contents of the transmitted data signal, based on the received data signal including the data channel, to obtain estimated chip contents;
    means for computing a data signal-aided channel impulse response (CIR) estimate based on at least the estimated chip contents;
    means for receiving a pilot signal broadcast by the network entity;
    means for computing a pilot signal-based CIR estimate based on the received pilot signal; and
    means for computing a combined CIR estimate by linearly combining the data signal-aided CIR estimate and the pilot signal-based CIR estimate, wherein the linearly combining comprises weighting the data signal-aided CIR estimate and the pilot signal-based CIR estimate.

11. The apparatus of claim 10, further comprising means for programming a reconstruction filter based on the combined CIR estimate.

12. The apparatus of claim 10, further comprising means for performing at least a portion of the method of claim 1 during each of one or more iterations associated with each of one or more data blocks of the signal.

13. The apparatus of claim 10, further comprising means for performing at least a portion of the method of claim 1 once for each of one or more channels of the signal.

14. The apparatus of claim 10, wherein the means for computing the data signal-aided CIR estimate comprises means for computing the data signal-aided CIR estimate during each of one or more iterations of processing the received signal.

15. The apparatus of claim 10, wherein the means for computing the data signal-aided CIR estimate comprises means for computing a cross-correlation of the estimated chip contents and at least the received data channel.

16. The apparatus of claim 10, further comprising means for performing interference cancellation associated with the signal based on the combined CIR estimate.

17. The apparatus of claim 10, further comprising means for altering one or more equalizer taps for use in at least one subsequent iteration based on the combined CIR estimate.

18. The apparatus of claim 10, further comprising:
    means for ascertaining a mobility state associated with a respective user equipment (UE); and
    wherein the means for computing the combined CIR estimate CIR further comprises means for computing the combined CIR estimate as a function of the mobility state.

19. A non-transitory computer-readable storage medium for enhanced received signal processing, comprising code for:
    receiving a data signal corresponding to a transmitted data signal sent by a network entity, wherein the transmitted data signal comprises at least a data channel;
    estimating chip contents of the transmitted data signal, based on the received data signal including the data channel, to obtain estimated chip contents; and
    computing a data signal-aided estimated channel impulse response (CIR) estimate based on at least the estimated chip contents;
    receiving a pilot signal broadcast by the network entity;
    computing a pilot signal-based CIR estimate based on the received pilot signal; and
    computing a combined CIR estimate by linearly combining the data signal-aided CIR estimate and the pilot signal-based CIR estimate, wherein the linearly combining comprises weighting the data signal-aided CIR estimate and the pilot signal-based CIR estimate.

20. The non-transitory computer-readable storage medium of claim 19, further comprising code for programming a reconstruction filter based on the combined CIR estimate.

21. The non-transitory computer-readable storage medium of claim 19, further comprising code for performing at least portion of the method of claim 1 during each of one or more iterations associated with each of one or more data blocks of the signal.

22. The non-transitory computer-readable storage medium of claim 19, further comprising code for performing at least a portion of the method of claim 1 once for each of one or more channels of the signal.

23. The non-transitory computer-readable storage medium of claim 19, wherein computing the data signal-aided CIR estimate occurs during each of one or more iterations of processing the received signal.

24. The non-transitory computer-readable storage medium of claim 19, wherein the code for computing the data signal-aided CIR estimate comprises code for computing a cross-correlation of the estimated chip contents and at least the received data channel.

25. The non-transitory computer-readable storage medium of claim 19, further comprising code for performing interference cancellation associated with the signal based on the combined CIR estimate.

26. The non-transitory computer-readable storage medium of claim 19, further comprising code for altering one or more equalizer taps for use in at least one subsequent iteration based on the combined CIR estimate.

27. The non-transitory computer-readable storage medium of claim 19, further comprising code for:
   ascertaining a mobility state associated with a respective user equipment (UE); and
   wherein computing the combined CIR estimate further comprises computing the combined CIR estimate as a function of the mobility state.

28. An apparatus for enhanced received signal processing, comprising:
   a receiver configured to receive a data signal transmitted by a network entity associated with a data channel and to receive a pilot signal broadcast by the network entity;
   a signal enhancement component configured to estimate a chip contents of the transmitted signal to obtain an estimated chip contents;
   a correlator configured to compute an estimated channel impulse response (CIR) based on at least the estimated chip contents; and
   a processor configured to:
      compute a pilot signal-based CIR estimate based on the received pilot signal; and
      compute a combined CIR estimate by linearly combining the data signal-aided CIR estimate and the pilot signal-based CIR estimate, wherein the linearly combining comprises weighting the data signal-aided CIR estimate and the pilot signal-based CIR estimate.

29. The apparatus of claim 28, wherein the signal enhancement component is further configured to program a reconstruction filter based on the combined CIR estimate.

30. The apparatus of claim 28, wherein the signal enhancement component is configured to perform at least portion of the method of claim 1 during each of one or more iterations associated with each of one or more data blocks of the signal.

31. The apparatus of claim 28, wherein the signal enhancement component is configured to perform at least a portion of the method of claim 1 once for each of one or more channels of the signal.

32. The apparatus of claim 28, wherein the correlator computes the data signal-aided CIR estimate during each of one or more iterations of processing the received signal.

33. The apparatus of claim 28, wherein computing the data signal-aided CIR estimate comprises computing a cross-correlation of the estimated chip contents and at least the received data channel.

34. The apparatus of claim 28, wherein the signal enhancement component is further configured to perform interference cancellation associated with the signal based on the combined CIR estimate.

35. The apparatus of claim 28, further comprising an equalizer configured to alter one or more equalizer taps for use in at least one subsequent iteration based on the combined CIR estimate.

36. The apparatus of claim 28, wherein the signal enhancement component is further configured to ascertain a mobility state associated with a respective user equipment (UE) and wherein the correlator is further configured to compute the combined CIR estimate as a function of the mobility state.

* * * * *